US012767129B2

(12) United States Patent
Raikar et al.

(10) Patent No.: US 12,767,129 B2
(45) Date of Patent: Oct. 20, 2026

(54) SYSTEMS AND METHODS FOR SMOOTH LANE POSITIONING

(71) Applicant: Torc Robotics, Inc., Blacksburg, VA (US)

(72) Inventors: Akshay Pai Raikar, Blacksburg, VA (US); Joseph R. Fox-Rabinovitz, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 304 days.

(21) Appl. No.: 18/410,073

(22) Filed: Jan. 11, 2024

(65) Prior Publication Data

US 2025/0229776 A1 Jul. 17, 2025

(51) Int. Cl.
*B60W 30/12* (2020.01)
*B60W 60/00* (2020.01)

(52) U.S. Cl.
CPC .......... *B60W 30/12* (2013.01); *B60W 60/001* (2020.02); *B60W 2552/53* (2020.02)

(58) Field of Classification Search
CPC . B60W 30/12; B60W 60/001; B60W 2552/53
See application file for complete search history.

(56) References Cited

U.S. PATENT DOCUMENTS 9,180,908 B2 11/2015 Van Dan Elzen et al.
9,421,973 B2 8/2016 Lee
10,571,923 B2 2/2020 Tamboli et al.
11,136,027 B2 10/2021 Kato et al.
12,534,108 B2 * 1/2026 Raikar .............. B60W 60/0025
2022/0363257 A1 11/2022 Temel et al.
2025/0229776 A1 * 7/2025 Raikar .................. B60W 30/12

FOREIGN PATENT DOCUMENTS

CN 109695187 A * 4/2019 ............. E01F 9/576
CN 115375956 A * 11/2022
CN 120783144 A * 10/2025
WO WO-2008089966 A2 * 7/2008 ............... G06T 7/60
WO WO-2024172119 A1 * 8/2024 ...... B60W 30/18163

* cited by examiner

*Primary Examiner* — John Kwon
(74) *Attorney, Agent, or Firm* — Armstrong Teasdale LLP

(57) ABSTRACT

An autonomy computing system for an autonomous vehicle traveling through a lane width irregularity includes at least one memory storing executable instructions defining a lane positioning module and at least one processor. The processor, upon executing the lane positioning module, is configured to: detect the lane width irregularity; select a lane marking to be used as a guide through the lane width irregularity; and maintain a predefined distance from the lane marking through the lane width irregularity.

17 Claims, 6 Drawing Sheets

SYSTEMS AND METHODS FOR SMOOTH LANE POSITIONING

TECHNICAL FIELD

The field of the disclosure relates generally to autonomous vehicles and, more specifically, lane positioning in regions of irregular lane width.

BACKGROUND

Autonomous vehicles are continuously sensing the environment and road the vehicle is travelling, collecting large amounts of data from sensors and remote sources, and processing the collected data to generate detailed information about the environment. An autonomy system of the autonomous vehicle processes the data and uses the results to make decisions about future operations of the autonomous vehicle.

A foundational aspect of autonomous operation of a vehicle on a roadway is to maintain the autonomous vehicle in its lane, e.g., between lane lines. At least some known autonomous systems detect lane markers on either side of the vehicle and operate roughly equidistant from both, i.e., in the center. However, merging lanes and obscured or missing lane markings can be perceived by the autonomous vehicle as sudden changes in lane width and can introduce behaviors by the autonomous vehicle that are unexpected and anomalous when experienced by passengers or observed by nearby drivers.

Therefore, a need exists for a simplified and efficient method of lane positioning in situations where the lane width may become irregular with respect to the rest of the road (e.g. when a lane ends, construction zones).

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, an autonomy computing system for an autonomous vehicle traveling through a lane width irregularity includes at least one memory storing executable instructions defining a lane positioning module and at least one processor. The processor, upon executing the lane positioning module, is configured to: detect the lane width irregularity; select a lane marking to be used as a guide through the lane width irregularity; and maintain a predefined distance from the lane marking through the lane width irregularity.

In another aspect, a method of lane positioning of an autonomous vehicle is provided. The autonomous vehicle is travelling through a lane width irregularity. The method includes detecting the lane width irregularity. The method includes selecting a lane marking to be used as a guide through the lane width irregularity. The method includes maintaining a predefined distance from the lane marking through the lane width irregularity.

In yet another aspect, an autonomous vehicle includes a plurality of sensors configured to detect a first lane marking and a second lane marking on the roadway, at least one memory configured to store executable instructions defining a lane positioning module, and at least one processor coupled to the at least one memory. The processor is configured, upon executing the executable instructions, to: detect a lane width irregularity based on the first lane marking and the second lane marking; select a lane marking among the first lane marking and the second lane marking to be used as a guide through the lane width irregularity; and maintain a predefined distance from the lane marking throughout the lane width irregularity.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
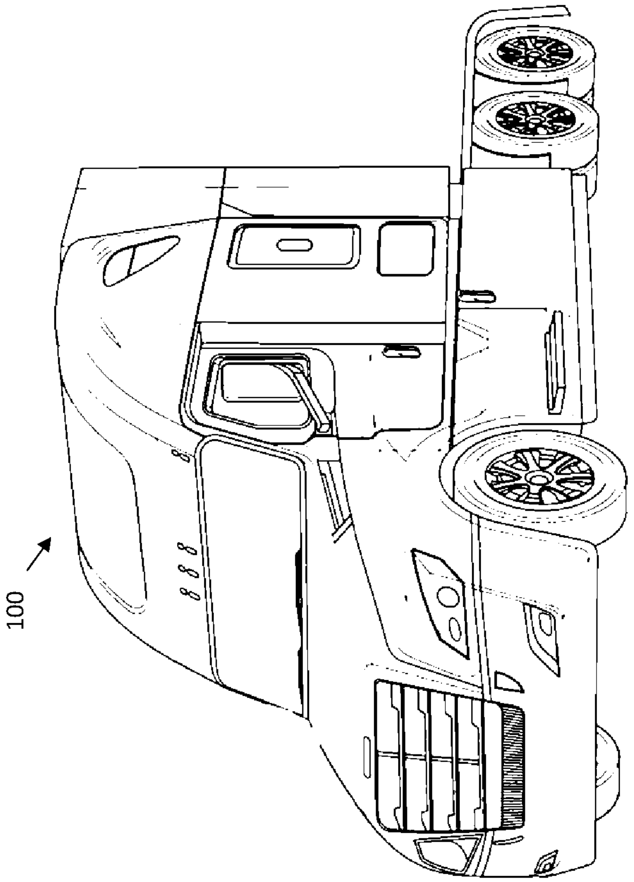
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

When an autonomous vehicle encounters a sudden change in lane width, for example, when a lane ends or lane markings are ambiguous or obscured, the autonomy system detects, at least momentarily, that the lane width roughly doubles where two lanes join and are no longer divided by a lane marking. This can result in a sudden steering "correction" to center the autonomous vehicle in what it detects is the new lane width, e.g., the center of the two merging lanes. Likewise, when a single lane divides into multiple lanes, new lane markings appear, resulting in a sudden steering correction to center the autonomous vehicle in one of the newly divided lanes. The behavior is often considered "jerky" by passengers and observers.

Lane width irregularities exist in myriad scenarios, including lane mergers and divisions, worn or obscured lane markings, or missing lane markings, which can be common in construction zones, for example, on temporary roadways or newly paved road. At least some of these scenarios are often accompanied by signage indicating the upcoming road condition. For example, lane mergers are often preceded by signage, and road construction commonly uses signage for safety reasons. However, signage is not uniform, may itself be obscured, worn, or fallen, and may be ambiguously perceived by an autonomous vehicle, rendering the autonomous vehicle incapable of correlating the signage to the autonomous vehicle's lane position. In other words, signage may not reliably translate, when perceived by the autonomous vehicle, to a smooth lane positioning maneuver by the autonomous vehicle.

The disclosed systems include an autonomy computing system that achieves a smooth lane positioning regardless of signage. The disclosed lane positioning methods identify either the left or right lane markings (or both) and controls the autonomous vehicle to position the autonomous vehicle a set distance from the identified (or selected one) lane marking.

Figure 2:
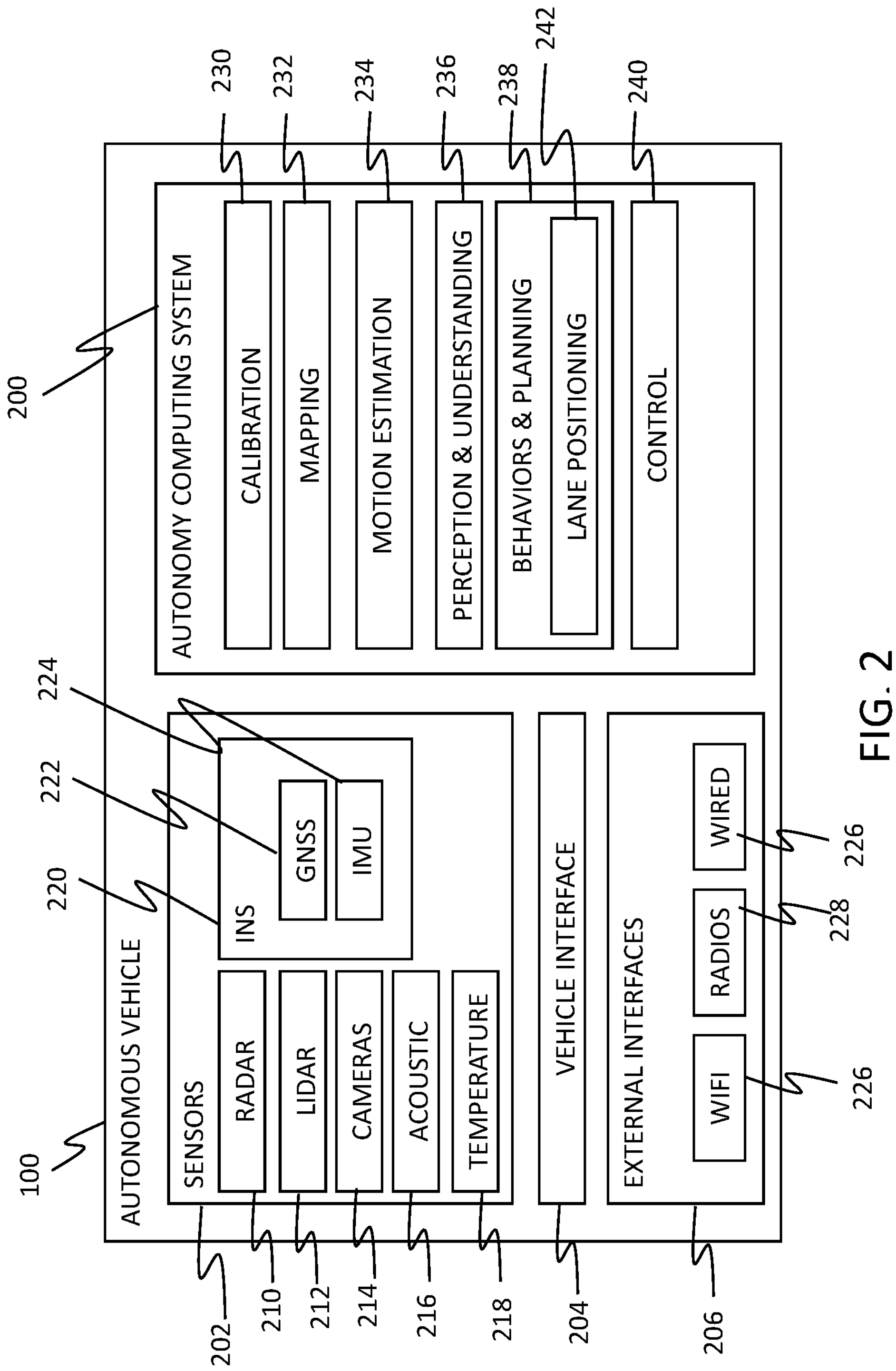
FIG. 2 is a block diagram of the vehicle that includes a lane positioning module.

FIG. 1 is a schematic diagram of an autonomous vehicle 100. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 120 to determine how to control operation of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5*g*, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and a lane positioning module 242. Lane positioning module 242, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Lane positioning module 242 maintains proper lane position for autonomous vehicle 100 in all conditions, e.g., regardless of signage for given road conditions. Lane positioning module 242 receives, for example, positions of left or right lane markings from perception and understanding module 236 and computes a lane position offset from the identified lane marking. Where both left and right lane markings are detected by perceptions and understanding module 236, in combination with sensors 202, lane positioning module 242 selects one lane marking from which lane positioning is derived.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
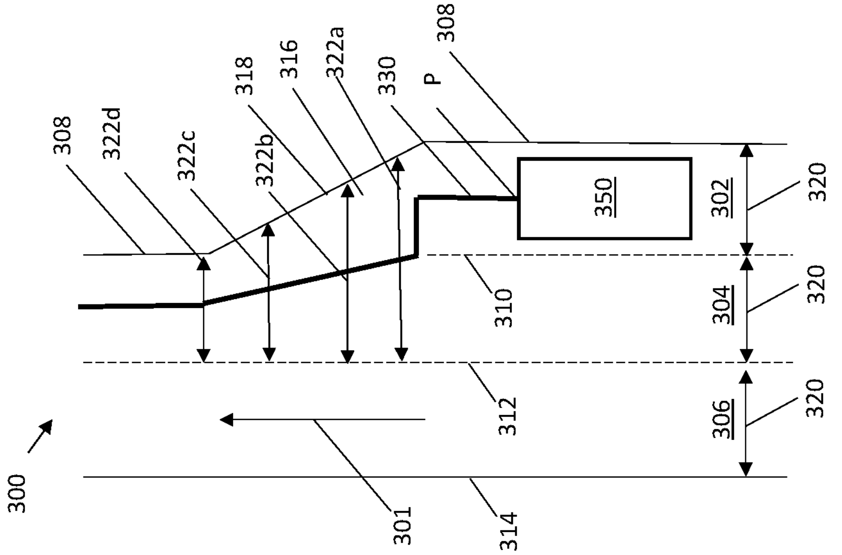
FIG. 3 PRIOR ART
FIG. 3 illustrates an example of an irregular lane width scenario.

FIG. 3 illustrates an example irregular lane width scenario 300 perceived by an autonomous vehicle 350. Autonomous vehicle 350 travels on a roadway with traffic in a direction identified by directional arrow 301. The roadway includes a plurality of lanes 302, 304, 306. Lane 302 is defined by a first outer lane marking 308 and a first lane marking 310. Lane 304 is defined by the first lane marking 310 and a second lane marking 312. Lane 306 is defined by second lane marking 312 and a second outer lane marking 314. Lane 302 includes an irregularity 316 (shown shaded for clarity), e.g., a merge zone or other region of lane width irregularity. As lane 302 merges into lane 304, first outer lane marking 308 includes an angled portion 318. Each of lanes 302, 304, 306 has a lane width 320 and, as illustrated, the width of each lane 302, 304, 306 is of substantially the same magnitude e.g. 12 feet. In irregularity 316, a transition lane width 322 is defined between the second lane marking 312 and angled portion 318 of the first outer lane marking 308. As shown in FIG. 3, the lane width dimension 322*a*, 322*b*, and 322*c* decreases as autonomous vehicle 350 progresses along the roadway. When irregularity 316 ends, the lane width returns to (at least approximately) normal width 322*d*.

Conventionally, autonomous vehicle 350 maintains a centered position within lane 302. In other words, autonomous vehicle 350 monitors the first outer lane marking 308 and first lane marking 310 and centers itself between these two markings. However, as autonomous vehicle 350 approaches irregularity 316, lane marking 310 disappears. As the lane 302 narrows, and lane marking 310 is removed, autonomous vehicle 350 centers itself between second lane marking 312 and first outer lane marking 308. In irregularity 316, autonomous vehicle 350 centers itself based upon the transition lane width 322*a*, 322*b*, 322*c*, and 322*d*.

A planned path 330 is shown in FIG. 3. Conventionally, planned path 330 is the path followed by a point P of autonomous vehicle 350 as the vehicles passes through irregularity 316. As autonomous vehicle 350 enters irregularity 316, first center line 310 ends. Autonomous vehicle 350 employs second center line 312 as a left guide. This results in autonomous vehicle 350 observing a sudden and significant increase in lane width, i.e., from lane width 320 to transition lane width 322*a*, 322*b*, 322*c*, and 322*d*. Planned path 330 includes an abrupt, discrete lateral shift followed by a smoothed transition, or merge, maneuver as autonomous vehicle 350 attempts to position itself between second lane marking 312 and angled portion 318 of first outer lane marking 308. Planned path 330 changes directions abruptly to correct for the sudden perceived change in lane width at irregularity 316. This results in an uncomfortable experience for occupants and observers of autonomous vehicle 350. In practice, for an autonomous truck for example, the actual path traveled by autonomous vehicle 350 is smoother due to physical limitations on lateral acceleration and design constraints on path planning. However, even then the lane centering maneuver is uncomfortable to occupants and is an undesirable merging maneuver.

Figure 4:
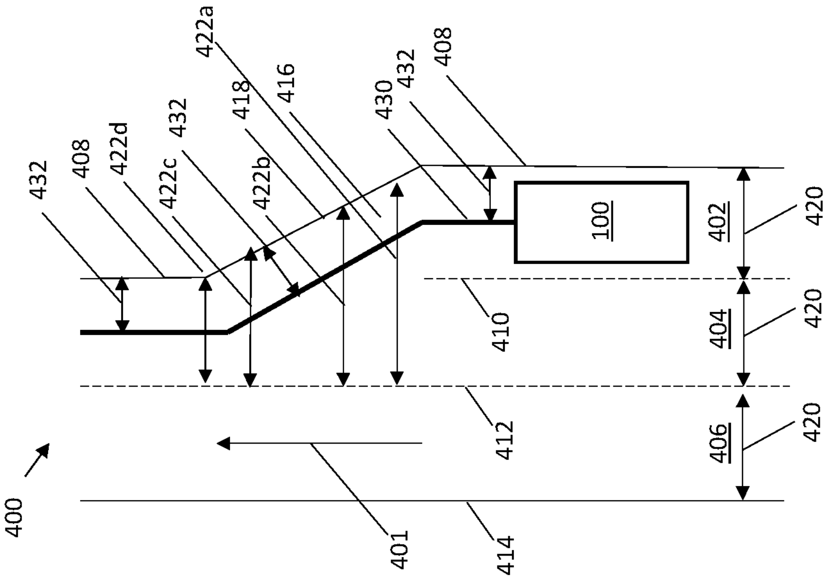
FIG. 4 illustrates lane positioning according to an embodiment of the disclosed lane positioning module.

FIG. 4 illustrates lane positioning according to an embodiment of lane positioning module 242 shown in FIG. 2. Autonomous vehicle 100 travels with traffic on a roadway in a direction identified by directional arrow 401. The roadway includes a plurality of lanes 402, 404, 406. Lane 402 is defined by a first outer lane marking 408 and a first lane marking 410. Lane 404 is defined by first lane marking 410 and a second lane marking 412. Lane 406 is defined by second lane marking 412 and a second outer lane marking 414. Lane 402 includes an irregularity 416 (shown shaded for clarity). As lane 402 ends, first outer lane marking 408 includes an angled portion 418. Each of lanes 402, 404, 406 has a lane width 420 and, as illustrated, the width of each lane 402, 404, 406 is of substantially the same magnitude e.g. 12 feet. In irregularity 416, a transition lane width 422 is defined by second lane marking 412 and angled portion 418 of first outer lane marking 408. As shown in FIG. 4, the lane width dimensions 422*a*, 422*b*, 422*c* decrease as autonomous vehicle progresses.

A planned path 430 is shown in FIG. 4. Notably, planned path 430 is free of sudden abrupt directional changes that are an attribute of planned path 330 shown in FIG. 3. Planned path 430 maintains a consistent distance 432 from first outer lane marking 408 before it enters irregularity 416, through irregularity 416, and after irregularity 416. As a result, the disclosed method of lane positioning provides for a smooth trajectory that is free of abrupt changes in direction as autonomous vehicle 100 navigates irregularity 416. By maintaining a constant distance from a selected lane marking (e.g., first outer lane marking 408 in this example) when a sudden increase in lane width is observed, i.e., lane width 422, there is a less dramatic change in planned path 430.

In the embodiment shown in FIG. 4, as autonomous vehicle 100 enters irregularity 416, first lane marking 410 ends. Autonomous vehicle 100 registers the change in lane width caused by first lane marking 410 ending. Autonomous vehicle 100 and, more specifically, autonomy computing system 200 and lane positioning module 242, compute curvature of lane markings on either side of autonomous vehicle 100. Generally, for a given lane, lane markings curve together with the road and, during normal operation, autonomous vehicle 100 maintains a lateral offset distance, for example, from both first outer lane marking 408 and first lane marking 410, resulting in autonomous vehicle 100 traveling roughly at the center of lane 402. When, for example, first lane marking 410 ends and autonomous vehicle 100 detects second lane marking 412, autonomy computing system 200 detects a difference in curvature (rising above a predetermined threshold) of first outer lane marking 408 and second lane marking 412. In particular, angled portion 418 of first outer lane marking 410 exhibits a different curvature than second lane marking 412. Autonomy computing system 200 determines which lane marking exhibits the lowest curvature and selects that lane marking to guide autonomous vehicle through irregularity 416. Curvature may be computed by any suitable known formula implemented in lane positioning module 242 and autonomy computing system 200. For example, curvature, K, may be parameterized by xs and ys, and a path length function, γ(s). Curvature for a given path length is computed as:

$$Ks = \left\| \frac{d^2\gamma}{ds^2} \right\| = \sqrt{\frac{d^2x^2}{ds^2} + \frac{d^2y^2}{ds^2}}$$

A total absolute curvature is computed by integrating curvature Ks over the path length, ds. Lane positioning module 242 utilizes a "lookahead" distance to define the path length for determining curvature. The lookahead distance is at most the effective range of forward looking sensors on autonomous vehicle 100. For example, sensors 202 may have an effective range of 100 meters or 200 meters. Left and right lane markings, for example, first outer lane marking 408 and first lane marking 410, are detected and represented as splines extending out the lookahead distance. Total absolute curvature for each is then computed by lane positioning module 242 over that lookahead distance, i.e., the path length, ds. The lane marking having the lower total absolute curvature is selected, and autonomous vehicle 100 maintains a predetermined offset from the selected lane marking.

Lane positioning module 242 determines when irregularity 416 ends by continuing to monitor the curvature of lane markings. When the curvature of the lane markings matches within a predetermined threshold, then the lane width is no longer irregular and is effectively constant. Lane positioning module 242, upon detecting the constant lane width, resumes operating autonomous vehicle 100 to center between left and right lane markings, e.g., between first outer lane marking 408 and second lane marking 412.

Figure 5:
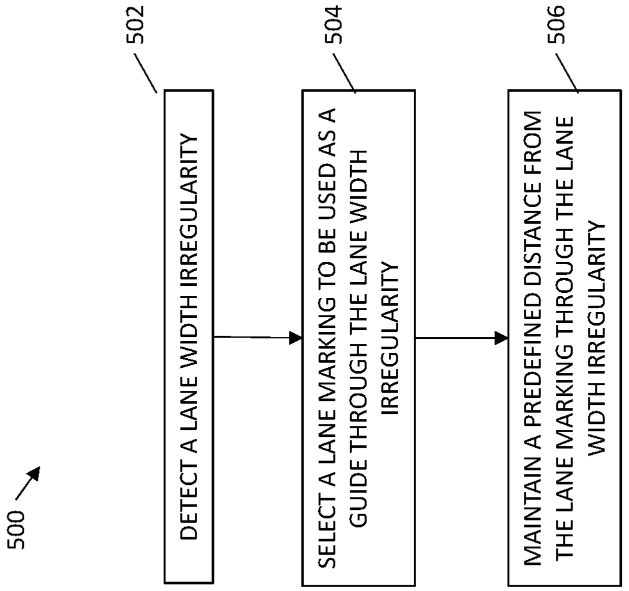
FIG. 5 is a flow chart of an embodiment of a method of lane positioning.

FIG. 5 is a flow chart of an embodiment of a method 500 of lane positioning for an autonomous vehicle, such as autonomous vehicle 100 shown in FIGS. 1-2 and 4. Referring to FIG. 4, autonomous vehicle 100 travels along the roadway initially in lane 402. Autonomous vehicle 100 detects first outer lane marking 408 and first lane marking 410 and, when lane width irregularity 416 is approached, lane positioning module 242 detects 502 lane width irregularity 416. In certain embodiments, lane width irregularities, such as a lane ending, construction zone, or obscured or missing lane markings, are detected by periodically computing curvature of lane markings on the left and right sides of autonomous vehicle 100. When the curvatures no longer match within a predetermined threshold (e.g., 2%, 5%, 10%, etc.), then lane width is changing and a lane width irregularity is detected 502.

One lane marking is selected 504 by lane positioning module 242 to be used as a guide through lane width irregularity 416. For example, lane positioning module 242, in certain embodiments, selects the lane marking exhibiting a lower curvature. Lane positioning module 242 then maintains 506 autonomous vehicle 100 at a predefined distance from the selected lane marking through lane width irregularity 416. For example, lane positioning module 242 may select first outer lane marking 408 and, more specifically, angled portion 418, to use as a guide. Autonomous vehicle 100 maintains planned path 430, which maintains the predefined distance from first outer lane marking 408 until the end of lane width irregularity 416 is reached.

Methods described herein may be implemented, for example, on autonomy computing system 200 shown in FIG. 2 or any suitable computing device. Autonomy computing system 200 described herein may be any suitable computing device and software implemented therein.

Figure 6:
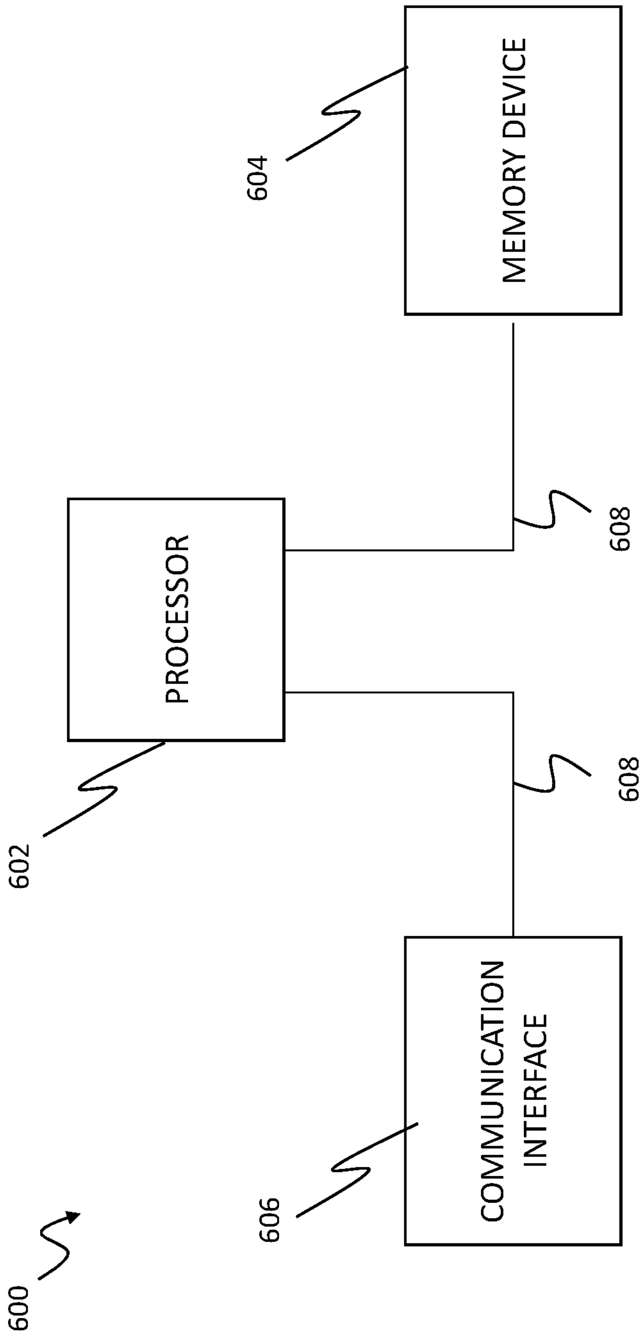
FIG. 6 is a block diagram of an example computing device.

FIG. 6 is a block diagram of an example computing device 600. Computing device 600 includes a processor 602 and a memory device 604. The processor 602 is coupled to the memory device 604 via a system bus 608. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 604 includes one or more devices that enable information, such as executable instructions or other data (e.g., sensor data), to be stored and retrieved. Moreover, the memory device 604 includes one or more computer readable media, such as, without limitation, dynamic random access memory (DRAM), static random access memory (SRAM), a solid state disk, or a hard disk. In the example embodiment, the memory device 604 stores, without limitation, application source code, application object code, configuration data, additional input events, application states, assertion statements, validation results, or any other type of data. The computing device 600, in the example embodiment, may also include a communication interface 606 that is coupled to the processor 602 via system bus 608. Moreover, the communication interface 606 is communicatively coupled to data acquisition devices.

In the example embodiment, processor 602 may be programmed by encoding an operation using one or more executable instructions and providing the executable instructions in the memory device 604. In the example embodiment, the processor 602 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least one of: (a) identifying a lane ending without indicating signage; (b) determining a smooth path for merging; or (c) returning to normal lane positioning algorithms after performing a merge due to a lane ending.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to one or more processors, processing devices or systems, general purpose central processing units (CPUs), graphics processing units (GPUs), microcontrollers, microcomputers, programmable logic controllers (PLCs), reduced instruction set computer (RISC) processors, field programmable gate arrays (FPGAs), digital signal processors (DSPs), application specific integrated circuits (ASICs), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or a electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable, and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. An autonomy computing system for an autonomous vehicle traveling through a lane width irregularity, the autonomy computing system comprising:
- at least one memory storing executable instructions defining a lane positioning module; and
- at least one processor, wherein the at least one processor, upon executing the lane positioning module, is configured to:
  - detect the lane width irregularity;
  - select a lane marking to be used as a guide through the lane width irregularity by selecting the lane marking between a left lane marking and a right lane marking having a lower curvature; and
  - maintain a predefined distance from the lane marking through the lane width irregularity.

2. The autonomy computing system of claim 1, wherein, prior to identifying the lane width irregularity, the lane positioning module maintains a center position between a left lane marking and a right lane marking.

3. The autonomy computing system of claim 2, wherein the at least one processor is further configured to detect the lane width irregularity by:
- computing curvatures for each of the left lane marking and the right lane marking; and
- determining a difference between the curvatures exceeds a predetermined threshold.

4. The autonomy computing system of claim 1, wherein the lane marking includes a solid lane marking indicating an outer lane marking of a roadway.

5. The autonomy computing system of claim 1, wherein the at least one processor is further configured to identify the autonomous vehicle has passed the lane width irregularity by detecting a constant lane width.

6. The autonomy computing system of claim 1, wherein the at least one processor is further configured to detect the lane width irregularity by measuring a lane width exceeding a predetermined threshold.

7. A method of lane positioning of an autonomous vehicle travelling through a lane width irregularity, the method comprising:
- detecting the lane width irregularity by:
  - computing curvatures for each of a left lane marking and a right lane marking; and
  - determining a difference between the curvatures exceeds a predetermined threshold;
  - selecting a lane marking to be used as a guide through the lane width irregularity; and
  - maintaining a predefined distance from the lane marking through the lane width irregularity.

8. The method of claim 7 further comprising, prior to identifying the lane width irregularity, maintaining a center position between a left lane marking and a right lane marking.

9. The method of claim 8, wherein selecting the lane marking comprises selecting the lane marking among the left lane marking and the right lane marking having a lower curvature.

10. The method of claim 7, wherein the lane marking includes a solid lane marking indicating an outer lane marking of a roadway.

11. The method of claim 7, further comprising identifying the autonomous vehicle has passed the lane width irregularity by detecting a constant lane width.

12. The method of claim 7, wherein detecting the lane width irregularity comprises measuring a lane width exceeding the predetermined threshold.

13. An autonomous vehicle configured to travel on a roadway, the autonomous vehicle comprising:
- a plurality of sensors configured to detect a first lane marking and a second lane marking on the roadway;
- at least one memory configured to store executable instructions defining a lane positioning module;
- at least one processor coupled to the at least one memory and configured, upon executing the executable instructions, to:
  - detect a lane width irregularity based on the first lane marking and the second lane marking;
  - select a lane marking among the first lane marking and the second lane marking to be used as a guide through the lane width irregularity by selecting the lane marking between the first lane marking and the second lane marking having a lower curvature; and
  - maintain a predefined distance from the lane marking throughout the lane width irregularity.

14. The autonomous vehicle of claim 13, wherein, prior to identifying the lane width irregularity, the lane positioning module maintains a center position between the first lane marking and the second lane marking.

15. The autonomous vehicle of claim 14, wherein the at least one processor is further configured to detect the lane width irregularity by:
- computing curvatures for each of the first lane marking and the second lane marking; and
- determining a difference between the curvatures exceeds a predetermined threshold.

16. The autonomous vehicle of claim 13, wherein the lane marking includes a solid lane marking indicating an outer lane marking of a roadway.

17. The autonomous vehicle of claim 13, wherein the at least one processor is further configured to identify the autonomous vehicle has passed the lane width irregularity by detecting a constant lane width.

* * * * *